Patented Oct. 20, 1942

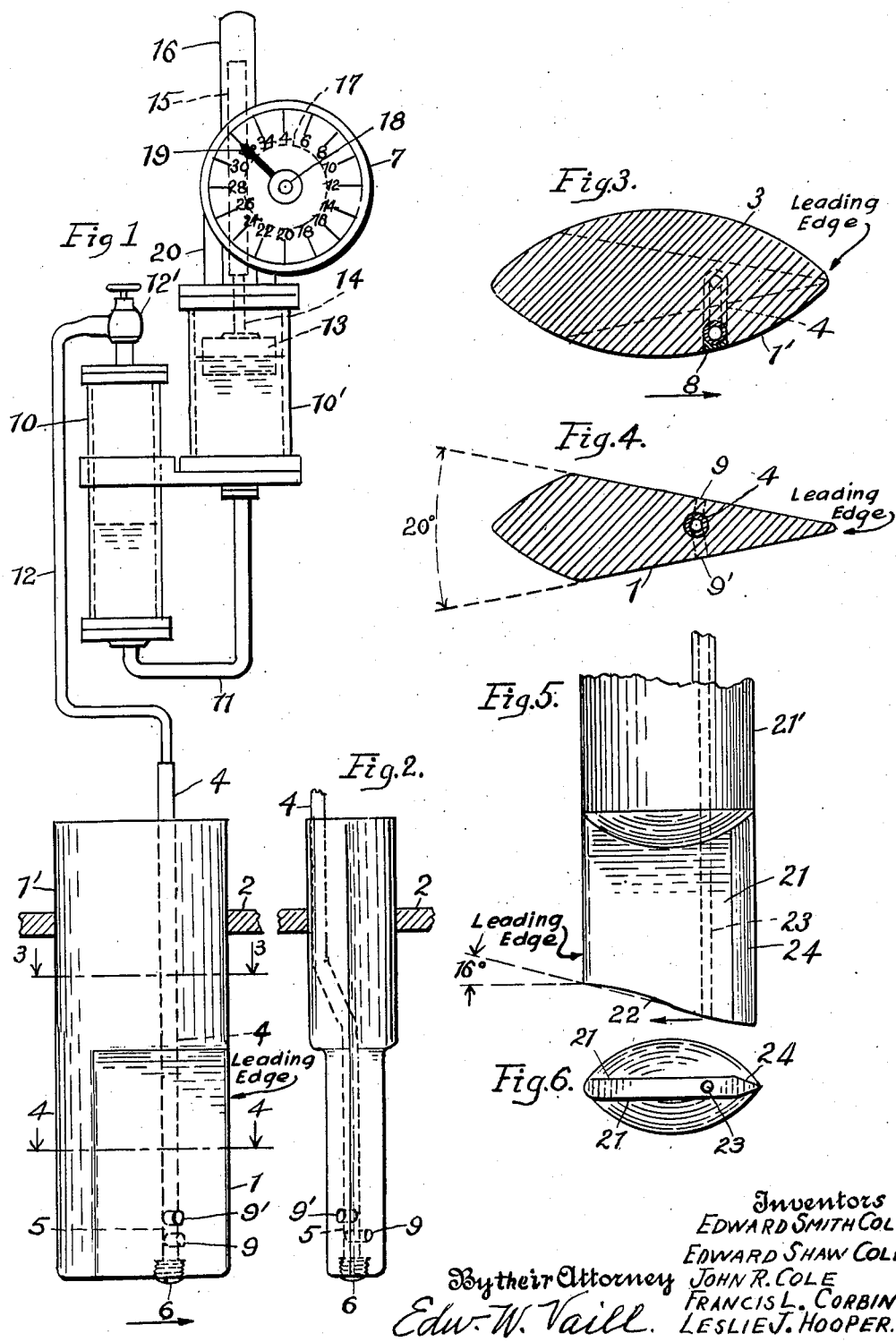

2,299,077

UNITED STATES PATENT OFFICE 2,299,077

DRAFT GAUGE FOR SHIPS

Edward Smith Cole and John R. Cole, Upper Montclair, N. J., assignors to Pitometer Log Corporation, a corporation of New York Application July 25, 1939, Serial No. 286,344

9 Claims. (Cl. 73—299)

The object of this invention is primarily to produce an efficient and accurate instrument for measuring the draft of vessels irrespective of their rates of speed while moving or travelling through water. It is also capable of use for other purposes.

Heretofore, it has been simple to measure from the inside, the depth of various objects below the surface of a liquid in which they have been immersed if the liquid does not move relative to the instrument being used.

However, when a vessel is moving through the water, such as when a steamship or other similar craft is travelling on its course, the relative motion of the hull or other submerged parts makes the use of such measuring instruments impractical to indicate the draft accurately or reliably.

Obviously, moving vessels cannot be stopped or brought to rest in order to make measurements of the draft of the ship. Nor do they always move in a straight line on their courses in the direction in which their keels lie, especially when yawing or encountering cross-currents.

Therefore, it is the purpose of the present invention to devise a draft measuring instrument that may be used on moving vessels, and one that will indicate or measure at various locations on a ship the draft of the ship below the surface of the water with accuracy regardless of deviations from the ship's normal course due to yawing.

With the above mentioned objects in view, we have devised and designed a static rod-meter that may extend from the interior of the hull of a vessel into the surrounding water and one that will accomplish the desired objects above set forth.

For a description of embodiments of the present invention reference may be had to the following explanation of parts, taken in connection with the accompanying drawing in which:

Figure 1 is a side elevation of our improved instrument or device for operating the indicator that is shown schematically in elevation.

Fig. 2 is a front view of the operating rod in elevation looking toward the forward or leading edge of the instrument when it is passing through the water.

Fig. 3 is a cross-sectional view taken substantially on the line 3—3 of Fig. 1 but somewhat enlarged.

Fig. 4 is a cross-sectional view taken substantially on the line 4—4 of Fig. 1 and also somewhat enlarged.

Fig. 5 is a side view of a modified form of the draft gauge and

Fig. 6 is a plan view of the bottom of the device shown in Fig. 5.

Referring to the drawing, the numerals 1 and 1' indicate a rod that is in the nature of a so-called "piezometer" and is adapted to extend through the hull of a vessel or boat, as indicated at 2, to enter the surrounding medium such as water, at points where the passing of the water is as uniform in one direction as is possible.

The upper portion 1' of the rod is of any preferred shape and in this instance has an outline that is nearly elliptical in cross-section as indicated at 3 in Fig. 3. The lower portion 1 of the rod is of an angular or wedge-shape in cross-section as indicated in Fig. 4.

The rod is provided with a longitudinal passage or conduit 4 that extends through both the upper and lower portions 1' and 1. The size of the conduit 4 is not important but it is preferably somewhat reduced in diameter at 5 and the lower end thereof is closed in any suitable way as by a plug 6.

The conduit 4 is suitably connected with a pressure indicating or registering device of any preferred type. The indicator in the present case is one that operates on principles that are similar to those of the well-known U-shaped tube or manometer which should be located in the ship below the water level or the surrounding liquid.

The parts of the present indicating device 7 comprise a cylinder 10 and a cylinder 10' that are connected at their lower ends by a tube or conduit 11.

The cylinder 10 is provided with a pressure tube 12 that is a continuation of the conduit or pipe 4. A valve or cock 12' may be provided whereby the pressure in the rod passage may be caused to become inoperative on the indicator when desired. The cylinders 10 and 10' are partly filled with mercury, the surfaces of which are substantially at the same level when no pressure is supplied by the tubes 4 and 12, which are normally filled with water. The weight of the water may produce a slight difference in the levels of the bodies of mercury.

In the upper part of Fig. 1, the surfaces of the mercury columns in the cylinders 10 and 10', have been shown as displaced by the fluid pressure existing in said tubes when the draft of a vessel is being measured.

A float 13 preferably partly submerged in the mercury in the cylinder 10', rises and falls according to the pressure produced in the tubes 4 and 12. The float 13 is provided with a vertical stem or rod 14 that is attached to or carries a rack 15 that moves vertically in a suitable housing 16. The rack 15 meshes with a pinion 17 the shaft 18 of which carries a pointer, hand, or other indicating means 19. A standard 20 mounted on the top of the cylinder 10' supports the dial of the indicating device 7 and the parts cooperating therewith.

It will now be seen that when a fluid pressure is produced in the conduit 12 the mercury in the cylinder 10 will be depressed and it will rise in the cylinder 10' which raises the float 13 causing the end of the pointer 19 to rest at a point corresponding to the height of the level of the mercury in the cylinder 10'. The proper calibration of the dial of the indicator 7 will accurately indicate the draft of the vessel.

The conduit or tube 4 is fixed in a groove 8 and the lower portion 1 of the rod has a reduced passage formed by a hole as at 5 that is located approximately one-third of the length or distance between the leading and trailing edges or limits of said portion 1 and said hole is closed by a screw-thread plug 6.

The hole 5 communicates with two somewhat smaller holes 9 and 9'. The thickness of the portion 1 where their orifices occur and the angle between the outer surfaces of the wedge 1 are very important where the highest accuracy is desired.

We have found that the wedge-shaped portion 1 of the rod should be about .450 of an inch between the orifices formed by the holes 9 and 9'. The distance from the apex of the angle formed by the wedge should be about 1 inch if the portion 1 of the rod, as in Fig. 3, is about 3 inches in length horizontally.

The axes of the holes 9 and 9' according to the above dimensions are preferably approximately 3/8 of an inch apart vertically (Figs. 1 and 2) and their diameters should be 1/8 of an inch, their axes having directions that are normal or at right angles to the respective surfaces of the wedge-shaped portion 1 which it has been found should be at an angle of about 20 degrees.

The use of the draft gauge above described will be clear from the explanations made heretofore.

It may be said however that when the wedge-shaped portion 1 is passing through the water, its advancing motion will cause the true static pressure indicated by the manometer, to vary only slightly from that produced when there is no advancing motion. That fact will enable an observer to determine the draft of the ship with accuracy regardless of the speed at which the vessel or boat may be moving which may be from zero knots up to thirty-five knots or over. That result is due to the size, position and relative angles at which the adjacent surfaces and holes 9 and 9' are placed.

Figs. 5 and 6, illustrate a form of rod for a draft gauge that is somewhat simpler and more easy to manufacture than the first form. In this form of the rod the measuring element is mainly an appropriate embodiment of a piezometer that projects through an opening in the hull of a vessel and is sensitive to or affected only by the depth of the element regardless of the motion of the vessel.

In said figure the numeral 21 designates the lower end of the rod which, in this form, is preferably in the shape of a comparatively thin blade. Its lower or outer surface is preferably sloped downward from the front toward the rear of the rod so that generally a rather acute angle of about 16 degrees is formed with a horizontal line of advance as indicated at 22.

The trailing edge of the blade of said rod is preferably angular as indicated at 24 in Fig. 6 but may be made of any other appropriate shape.

The projection of the rod beyond the surface of the hull is essential on account of freeing the orifice therein from the effects of eddy currents and also the adjacent accumulations of foreign matter that would seriously affect the accuracy of the instrument should an orifice be made directly in the surface of the hull.

The lower or outer transverse surface of said end may be a plane or may be curved as indicated to produce the required fluid pressure in the tube 23 that transmits the said pressure to a manometer like that exemplified in Fig. 1. The exact form of the lower surface of the end of the rod will depend largely upon the conditions under which the rod is operated when installed on a moving vessel and the best form of said surface will have to be determined under such conditions, as it cannot be determined mathematically.

The operation is essentially the same as that of the form first described.

Various changes may be made by those skilled in the art without departing from the essentials of this invention as set forth in the appended claims.

What we claim and desire to protect by Letters Patent is:

1. A draft gauge for use on ships moving in liquids, comprising a static pressure measuring device adapted to extend beyond the surface of a ship's hull into the surrounding liquid and having two surfaces each at an acute angle to the forward direction of motion of the ship through the water, said angles being equal and said surfaces being disposed to converge in a forward direction, an orifice opening through each of said surfaces into communication with the surrounding liquid, pressure responsive indicating means, and conduit means providing a common connection for placing said orifices in communication with said indicating means.

2. A draft gauge for use in ships moving in liquids comprising a rod adapted to project into the liquid surrounding the ship, said rod having a reduced and wedge shaped outer end with the apex of the wedge shaped portion located forwardly with respect to the forward direction of motion of the ship and with the side surfaces of the wedge-shaped portion disposed at equal acute angles with respect to the direction of motion of the ship, each of said side surfaces having a laterally opening orifice therethrough to provide communication with the liquid, and a passage communicating with said orifices and extending lengthwise of said rod and adapted to be connected with a pressure sensitive indicator.

3. A device as set forth in claim 2 in which the orifices are located rearwardly of the apex of the wedge-shaped portion at substantially one-third of the distance from the leading to the trailing edge of said wedge-shaped portion, and in which the passages providing communication between said orifices and said lengthwise extending passage extend at right angles to said surfaces respectively, and in which the orifices in the respective surfaces are located at slightly different distances from the outer end of said rod.

4. A draft gauge for use on ships moving in liquids, comprising a static pressure measuring device adapted to extend beyond the surface of a ship's hull into the surrounding liquid and having two substantially plane surfaces each at an acute angle to the forward direction of motion of the ship through the water, said angles being equal, said surfaces being disposed to converge in a forward direction and the value of the included angle between said surfaces being of the order of 20°, an orifice opening through each of said surfaces into communication with the surrounding liquid, pressure responsive indicating means, and conduit means providing a common connection for placing said orifices in communication with said indicating means.

5. A draft gauge for use in ships moving in liquids comprising a rod adapted to project into the liquid surrounding the ship, said rod having a reduced and wedge shaped outer end with the apex of the wedge shaped portion located forwardly with respect to the forward direction of motion of the ship and with the side surfaces of the wedge-shaped portion disposed at equal acute angles with respect to the direction of motion of the ship, each of said side surfaces having a laterally opening orifice therethrough to provide communication with the liquid, said orifices being located rearwardly of the apex of said wedge shaped portion at substantially one-third of the distance from the leading to the trailing edge of said wedge-shaped portion, and a passage communicating with said orifices and extending lengthwise of said rod and adapted to be connected with a pressure sensitive indicator.

6. A draft gauge for use in ships moving in liquids comprising a rod adapted to project into the liquid surrounding the ship, said rod having a reduced and wedge-shaped outer end with the apex of the wedge-shaped portion located forwardly with respect to the forward direction of motion of the ship and with the side surfaces of the wedge-shaped portion disposed at equal acute angles with respect to the direction of motion of the ship, each of said side surfaces having a laterally opening orifice therethrough to provide communication with the liquid, said orifices being located rearwardly of the apex of said wedge-shaped portion at substantially one-third of the distance from the leading to the trailing edge of said wedge-shaped portion, a passage extending lengthwise of said rod and adapted to be connected with a pressure sensitive indicator, and transversely extending passages providing communication between said orifices and said lengthwise extending passage, said transversely extending passages extending at right angles to said surfaces, respectively.

7. A draft gauge for use on ships moving in liquids, comprising a measuring device adapted to project from the hull of the ship into the surrounding liquid, said device having an outer end surface inclined at an acute angle of the order of 16 degrees with respect to the direction of forward motion of the ship through the liquid and in a direction such that the leading portion of said end surface is at a higher level than the trailing portion thereof, an orifice opening through said surface in communication with the surrounding liquid, and a conduit extending through said device for connecting said orifice with a pressure sensitive indicator.

8. A device according to claim 7 in which the outer portion of said device comprises a blade like element extending in fore and aft direction, the major portions of the side surfaces of the said element being substantially parallel to each other.

9. A draft gauge for use on ships moving in liquids, comprising a static pressure measuring device adapted to extend beyond the surface of the hull of the ship into the surrounding liquid and having at least one orifice opening into communication with the liquid through a surface arranged at an acute angle with respect to the direction of motion of the ship through the liquid, the value of said angle being within a range of which the lower limit is of the order of 10 degrees and of which the upper limit is of the order of 16 degrees, pressure indicating means, and means for actuating said indicating means to give an indication corresponding at all times with the fluid pressure acting at said orifice.

EDWARD SMITH COLE,
JOHN R. COLE.